(12) United States Patent
Hernandez

(10) Patent No.: US 6,752,161 B2
(45) Date of Patent: Jun. 22, 2004

(54) MOTION WHEEL WASHER

(76) Inventor: Frederic Martin Hernandez, 8562 So. Santa Fe Ave., Hunting Park, CA (US) 90255

( * ) Notice: Subject to any disclaimer, the term of this patent is extended or adjusted under 35 U.S.C. 154(b) by 28 days.

(21) Appl. No.: 10/140,447

(22) Filed: May 7, 2002

(65) Prior Publication Data

US 2002/0162580 A1 Nov. 7, 2002

Related U.S. Application Data

(60) Provisional application No. 60/289,339, filed on May 7, 2001.

(51) Int. Cl.[7] ................................................ B08B 3/04
(52) U.S. Cl. .................. 134/113 R; 134/123; 134/198; 134/201
(58) Field of Search ............................. 134/45, 115 R, 134/123, 198, 201

(56) References Cited

U.S. PATENT DOCUMENTS

| | | | | |
|---|---|---|---|---|
| 2,933,337 A | * | 4/1960 | Katz | |
| 3,336,064 A | * | 8/1967 | Dzaack | |
| 3,401,707 A | * | 9/1968 | Horwitz | |
| 3,599,869 A | * | 8/1971 | Oderdofer | |
| 3,779,324 A | * | 12/1973 | Kreske, Jr. | |
| 3,795,254 A | * | 3/1974 | Blosser | |
| 4,269,141 A | * | 5/1981 | Kennett | |
| 4,791,947 A | * | 12/1988 | Holzberger | |
| 4,972,862 A | * | 11/1990 | Belanger et al. | |
| 4,985,957 A | * | 1/1991 | Belanger et al. | |
| 5,100,175 A | * | 3/1992 | Swallow et al. | |
| 5,269,464 A | * | 12/1993 | Epple et al. | |
| 6,270,586 B1 | * | 8/2001 | Soble | |

* cited by examiner

Primary Examiner—Frankie L. Stinson

(57) ABSTRACT

The motion wheel washer automatically washes the front wheels of a vehicle while the wheel is in motion. In one embodiment, the position of the front wheels and the vehicle speed is sensed. When the wheels are turned to the right or left at low speed, a nozzle residing inside the lip of the fender, in front of the wheel, directs a spray of a washing fluid against the outer surface of the wheel. When the wheels are turned the opposite direction, a spray is directed against the outer surface of the opposite wheel. In a second embodiment, a telescoping arm residing within the wheel well above the wheel, deploys to position a nozzle to spray the washing fluid against either wheel.

19 Claims, 4 Drawing Sheets

MOTION WHEEL WASHER

The present application claims the benefit of U.S. Provisional Application Serial No. 60/289,339, filed May 7, 2001, which application is incorporated herein by reference.

BACKGROUND OF THE INVENTION

The present invention relates to a device for automatically cleaning wheels on a vehicle, and more particularly to a device for automatically washing the front wheels on a moving automobile.

Almost all highway vehicles in current production include front disk brakes. The front brakes on such vehicles provide the majority of the braking, and as such, the front brakes experience significant break pad wear. The break pad wear is evident from the grayish-black dust that covers the front wheels of vehicles. The brake dust both creates an unsightly appearance, and creates a possible health risk due to the chemical makeup of some brake pad material.

While automatic systems are common for washing vehicle windshields, headlight, and even taillights, no automatic system has been developed for washing vehicle wheels. What is needed is a system that automatically washes brake dust off vehicle wheels.

SUMMARY OF THE INVENTION

The present invention addresses the above and other needs by providing a motion wheel washer that automatically washes the front wheels of a vehicle while the vehicle is being driven. The wheel washing system comprises at least one reservoir, pump, line, and nozzle, part of which may be shared with other washing systems. In one embodiment, the position of the front wheels and the vehicle speed is sensed. When the wheels are turned to the right or left at low speed, a nozzle residing inside the lip of the fender, directs a spray of a washing fluid against the outer surface of the wheel. When the wheels are turned the opposite direction, a spray is directed against the outer surface of the opposite wheel. Either existing sensors, or new sensors are used to determine the position (left versus right) of the front wheels, and the speed of the vehicle. When the washing system determines washing is required, or a driver issues a wash command, the system waits for the appropriate wheel position and vehicle speed. When the conditions are met, the system sprays a cleaning fluid on the wheels. The system may further include a second fluid for rinsing. In a second embodiment, a telescoping arm residing withing the wheel well above the wheel, deploys to position a nozzle to spray the washing fluid against either wheel.

In accordance with one aspect of the invention, there is provide a motion wheel washing system to automatically wash brake dust off the outside of a vehicle wheel. The motion wheel washing system directs a spray of a washing fluid against the outside surface of a vehicle wheel, and thereby washes away the brake dust that has settled on the wheel.

It is a feature of the present invention to provide an stationary nozzle mounted to the inside of the wheel well rim, in front of the wheel. By positioning the nozzle inside the rim of the front fender, the nozzle is protected from damage, is stationary thus avoiding moving parts, and is concealed.

It is a further feature of the invention to provide a motion wheel washing system which will wash the vehicle's wheels without requiring any attention from the driver. The motion wheel washing system is periodically self activating. By washing the wheels periodically, the buildup of brake dust on the wheels is prevented, thus allowing the motion wheel washing system to effectively remove the brake dust that has recently settled on the wheels.

It is an additional feature of the present invention to provide an embodiment of the motion wheel washer including both washing and rinsing. At least two reservoirs are provided, wherein a first reservoir contains a washing fluid, and a second reservoir contains a rinsing fluid. During operation, the motion wheel washer first sprays the washing fluid on the wheel being washed, and then sprays the rinsing fluid. Alternatively, a first nozzle sprays a washing fluid, and a second nozzle sprays a rinsing fluid.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
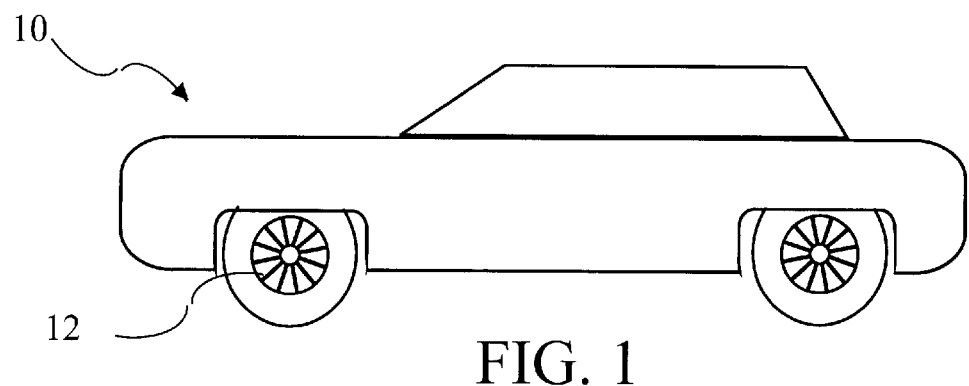
FIG. 1 shows a vehicle including wheels.

The motion wheel washing system provides an efficient and effortless way to prevent the unsightly buildup of brake dust on the wheels of a vehicle. A vehicle 10 with front wheel 12 is shown in FIG. 1. The front wheels of the vehicle 10 provide most of the braking for the vehicle 10, and as a result a buildup of break dust appears soon after washing the front wheel 12. While the primary goal of the motion wheel washing system is to wash brake dust off of the front wheels of a vehicle, those skilled in the art will also recognize that the motion wheel washing system may be adapted to also wash the rear wheels of a vehicle, and this variation is intended to come within the scope of the present invention.

Figure 2:
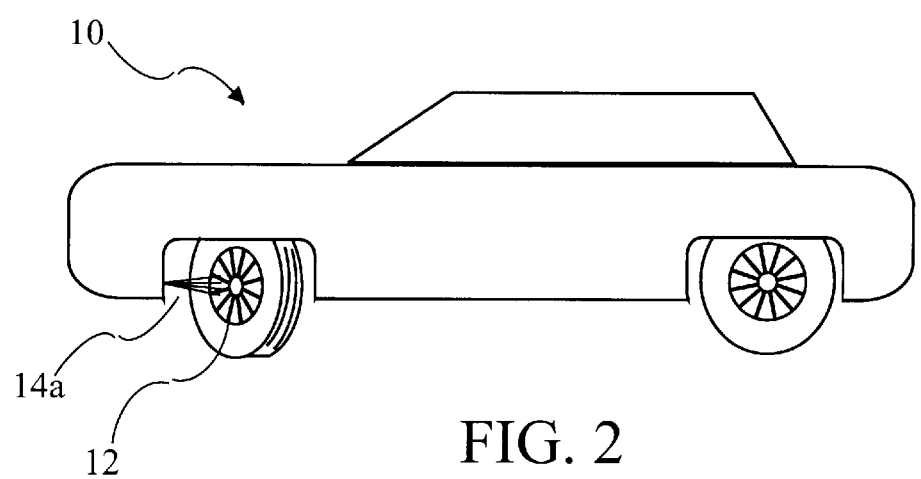
FIG. 2 shows the present invention directing a spray against an outside surface of a front wheel.

In a preferred embodiment shown in FIG. 2, the motion wheel washing system provides a spray 14a directed from a position ahead of the front wheel 12, toward an outside surface of the front wheel 12, when the front wheel 12 is turned away from the direction the spray 14a is arriving from.

Figure 3:
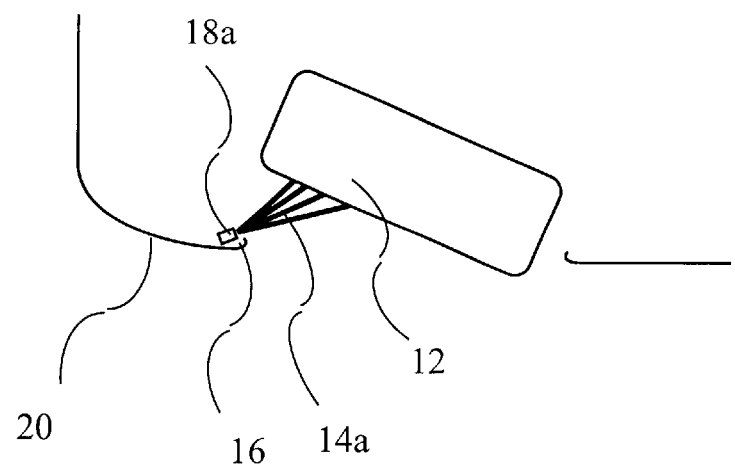
FIG. 3 depicts a nozzle positioned inside a front lip of a wheel well, wherein the nozzle is spraying a fluid against the outside surface of the front wheel.

A top view of the spray 14a and the wheel 12 is shown in FIG. 3. The spray 14a originates from a nozzle 18a, which nozzle is attached to an inside lip 16 of a fender 20. The nozzle 18a is attached to the inside lip 16 so that the spray 14a is directed onto the outside surface of the wheel 12 when the wheel 12 is turned to the right. Another nozzle is positioned on the opposite side of the car to wash the other front wheel when the wheels are turned to the left.

Those skilled in the art will recognize alternative positions for motion wheel washer nozzles. For example, the nozzle may be positioned higher or lower in the fender. The nozzle might also be positioned above the wheel, which position could be used for both front and rear wheels. In still another embodiment, a nozzle is positioned on the end of a telescoping arm, which allows the nozzle to be deployed outside the wheel well to provide a better aim towards the wheel. The pressure provided by the pump may be used to cause the telescoping nozzle to deploy when ever the system is operated. A telescoping arm may also be electrically deployed, and this and other embodiments of motion wheel washing systems are intended to come within the scope of the present invention.

Figure 4:
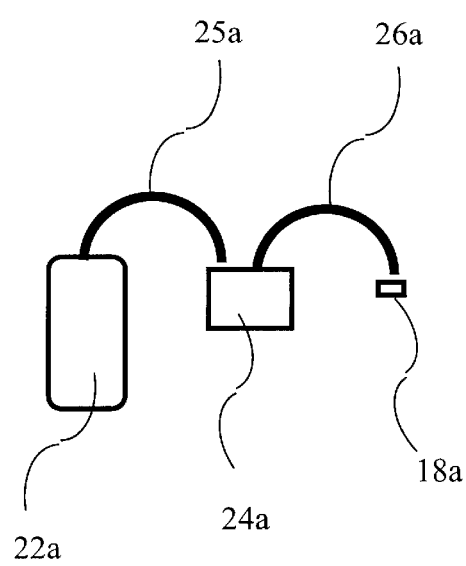
FIG. 4 shows a reservoir, pump and nozzle of the present invention.

Various combinations of a reservoir, pump, and nozzle may be utilized to construct the motion wheel washer system. A preferred embodiment of a combination of a reservoir, pump, and nozzle is shown in FIG. 4. A reservoir 22a is connected to a first pump 24a by a first pump line 25a. The nozzle 18a is connected to the pump 24a by a first nozzle line 26a.

Figure 4A:
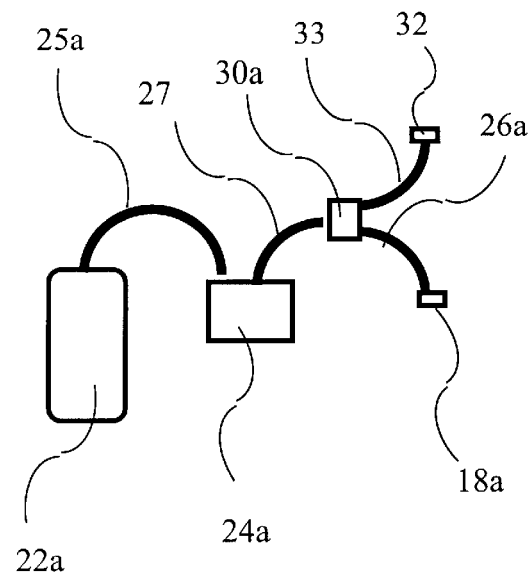

Alternatively, the motion wheel washer system may be combined with an existing washing system (e.g., a windshield washer or a headlight washer) as shown in FIG. 4A. In this embodiment the first reservoir 22a is an existing reservoir and the first pump 25a is an existing pump. The reservoir 22a is connected by line 25a to the pump 24a, and the pump 24a is connected by a valve line 27 to a first valve 30a. The valve 30a may be manually or automatically controlled, and the valve 30a includes a first position in which fluid is routed to an existing nozzle 32, and a second position in which fluid is routed to the nozzle 18a. An existing nozzle line 33 connects the valve 30a to the nozzle 32. The nozzle line 26a connects the valve 30a to the nozzle 18a. Thus by turning on the pump 24c, and switching the valve 30a to the second position, fluid is sprayed from the nozzle 18a.

Figure 5:
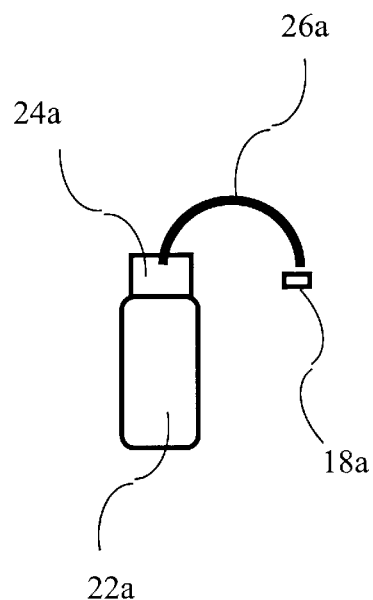
FIG. 5 shows a second embodiment of the reservoir, the pump, and the nozzle of the present invention, wherein the pump is attached to the reservoir.

In another embodiment is shown in FIG. 5, wherein the pump 24a is attached to the reservoir 22a. The nozzle 18a is connected to the pump 24a by the first nozzle line 26a.

Figure 6:
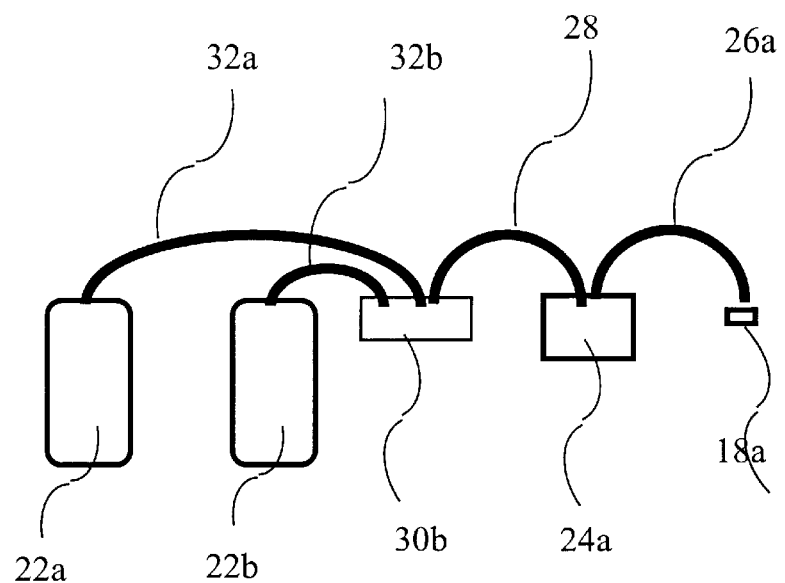
FIG. 6 shows a third embodiment of the present invention wherein two reservoirs are connected to the pump through a valve.

Various fluids may be used for washing brake dust from wheels. In some cases a washing fluid that requires rinsing may be preferred. In this case, a second reservoir containing a rinsing fluid may be used. In one embodiment shown in FIG. 6, the first reservoir 22a and a second reservoir 22b, are connected to a second valve 30b, by valve lines 32a and 32b respectively. The valve 30b selects either the fluid from the first reservoir 22a, or from the second reservoir 22b, and provides the selected fluid to the pump 24a through line 28. The pump 24a then pumps the selected fluid through line 26a to the nozzle 18a.

Figure 7:
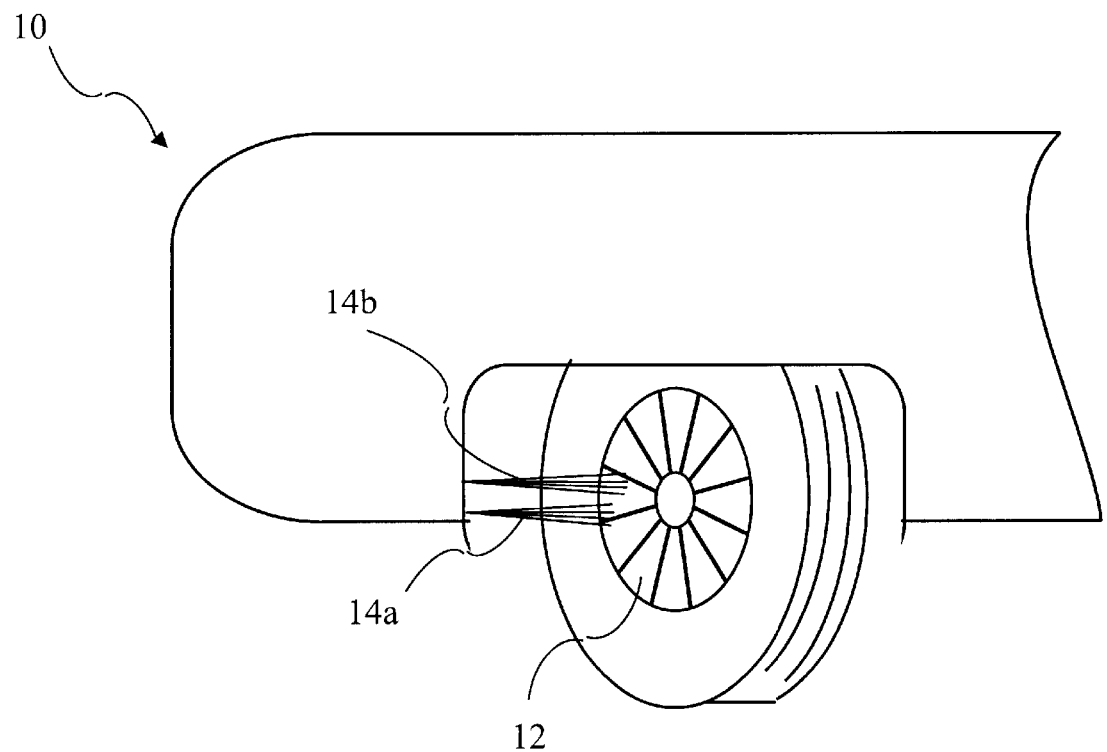
FIG. 7 shows an embodiment of the present invention wherein two sprays are directed toward the outside surface of the front wheel.

Another embodiment of a motion wheel washer with a rinsing fluid in FIG. 7, provides the first spray 14a, and a second spray 14b. The embodiment shown includes two independent motion wheel washing system for each wheel, the systems comprising a first reservoir and a second reservoir, a first pump and a second pump, and a first nozzle and a second nozzle.

Figure 8A:
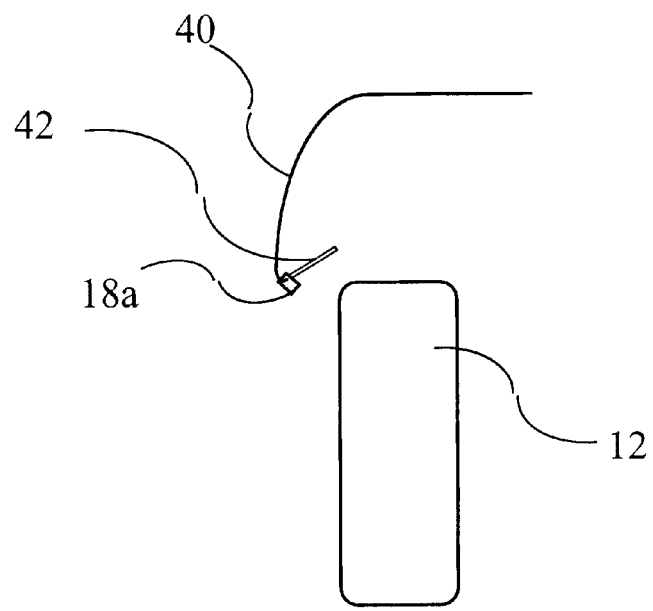
FIG. 8A shows the motion wheel washer in a retracted position.
Figure 8B:
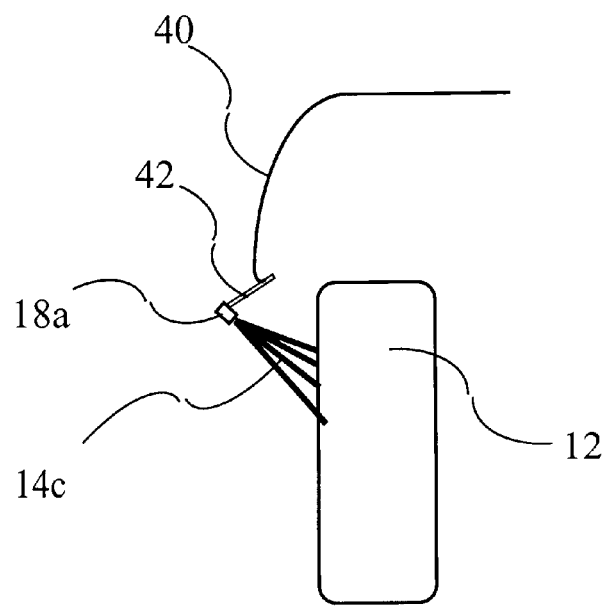
FIG. 8B shows the motion wheel washer extended and washing a wheel.

In yet another embodiment, the motion wheel washer is deployed above either a front wheel or a rear wheel. Such embodiment is shown with the nozzle 18A in a relaxed position in the top of a wheel well 40 above the wheel 12. The motion wheel washer is deployed in FIG. 8B, wherein the nozzle 18a is deployed by arm 42 such that the nozzle is facing the wheel 12. Such deployment may be by electrical (e.g., motor, linear motor, etc.) Or by some other means including a telescoping arm which is spring loaded on a relaxed position (not deployed) and is pushed into a deployed position by the pressure of fluid being pumped to the nozzle 18a.

The motion wheel washing system described herein further may include automation to periodically wash the wheels. Such automation includes measurements of vehicle speed, and measurements of wheel position (i.e., how much the wheels are turned right or left by action of the steering wheel.) The automation may also monitor the time, distance driven, or amount of brake use since the last automatic cleaning. When the automation determines that wheel cleaning is required, the vehicle speed, and wheel position are tested. When the speed is low, and the wheels are turned away from the nozzle (e.g, as in FIG. 3), the system will initiate an automatic washing. The wheel washing system may also include a driver actuated switch, wherein activation of the switch causes the fluid to be sprayed onto the wheel.

Those skilled in the art will recognize that the motion wheel washer may be used on a variety of vehicles including, but not limited to, automobiles, trucks, vans, buses, and other vehicles. The present invention is intended to include these and other uses.

While the invention herein disclosed has been described by means of specific embodiments and applications thereof, numerous modifications and variations could be made thereto by those skilled in the art without departing from the scope of the invention set forth in the claims.

What is claimed is:

1. A motion wheel washing system comprising:
   a first reservoir adapted to contain a first fluid;
   a first pump; and
   a first nozzle adapted to reside proximal to a wheel;
   wherein the first pump is adapted to move the first fluid from the first reservoir to the first nozzle, and wherein the first nozzle is adapted to direct a spray of the first fluid against an outside surface of the wheel.

2. The system of claim 1 wherein the first pump is attached to the first reservoir.

3. The system of claim 1 wherein the system further includes a first pump line connecting the first pump to the first reservoir, whereby the first pump receives the first fluid from the first reservoir.

4. The system of claim 1 wherein the first nozzle is attached to the inside of a lip of a fender.

5. The system of claim 4 wherein the first nozzle resides ahead of the wheel.

6. The system of claim 5 wherein the wheel is a front wheel.

7. The system of claim 6 wherein the first nozzle is aimed to spray the first fluid on an outside surface of the front wheel when the front wheel is turned away from the first nozzle.

8. The system of claim 1 further including a second reservoir and a second fluid, wherein the first fluid is a washing fluid, and the second fluid is a rinsing fluid.

9. The system of claim 8 wherein the system further includes a valve to selectively connect the first pump to one of the first reservoir and the second reservoir.

10. The system of claim 8 wherein the system further includes a second pump, wherein the first pump receives the first fluid from the first reservoir, and wherein the second pump receives the second fluid from the second reservoir.

11. The system of claim 10 wherein the second pump is connected to the first nozzle by a second nozzle line.

12. The system of claim 10 wherein the second pump is connected to a second nozzle by a second nozzle line.

13. The system of claim 1 further including a first valve, wherein the first reservoir is an existing reservoir and the first pump is an exiting pump, and the first pump is connected to the first valve a valve line, and wherein the first valve has a first position in which fluid is directed to an existing nozzle, and the first valve has a second position in which fluid is directed to the first nozzle.

14. The system of claim 1 further including a switch, wherein the switch is adapted to be accessible to a driver driving a vehicle wherein the system resides, wherein the actuating the switch causes the system to spray the first fluid onto the wheel.

15. The system of claim 1 further including an automatic control, wherein the automatic control monitors the speed of the vehicle, the position of the wheel.

16. The system of claim 15 wherein the automatic control further includes an indicator of the buildup of brake dust, wherein the indicator of the buildup of brake dust is at least one of the set consisting of: time since the last wheel washing, the distance driven since the last wheel washing, and the amount of brake use since the last wheel washing.

17. The system of claim 1 wherein the first nozzle resides on an arm above the wheel, and wherein the first nozzle has a relaxed position where in the nozzle is substantially inside the wheel well, and wherein the nozzle had a deployed position wherein the arm extends to position the nozzle facing the wheel.

18. A motion wheel washing system for washing the front wheels of a vehicle, comprising:
   at least one reservoir;
   at least one fluid;
   at least one pump adapted to pump one of the at least one fluid from one of the at least one reservoir;
   at least one nozzle adapted to spray one of the at least one fluid from one of the at least one pump, wherein the nozzle is adapted to be attached to a vehicle whereby the nozzle is pointed toward an outside surface of a proximal front wheel of the vehicle.

19. The system of claim 18 further comprising:
   means for measuring vehicle speed; and
   means for measuring left/right wheel turning position;
   wherein:
      the nozzle is adapted to be attached to a vehicle comprises the nozzle is adapted to be attached to a vehicle inside a lip of a front fender;
      the nozzle is pointed toward an outside surface of a proximal front wheel of the vehicle comprises the nozzle is pointed toward an outside surface of the proximal front wheel when the proximal front wheels is turned away from the nozzle; and
      the at least one nozzle adapted to spray comprises at least one nozzle adapted to spray when the vehicle speed is slow and when the proximal front wheel is turned away from the nozzle.

* * * * *